United States Patent
Taguchi et al.

(10) Patent No.: US 8,152,197 B2
(45) Date of Patent: Apr. 10, 2012

(54) SIDE AIRBAG STRUCTURE

(75) Inventors: Seigo Taguchi, Hlroshima (JP); Kazuya Fukutani, Hiroshima (JP); Hideharu Saiki, Hiroshima (JP); Nobuo Inoue, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 237 days.

(21) Appl. No.: 12/621,998

(22) Filed: Nov. 19, 2009

(65) Prior Publication Data
US 2010/0156071 A1    Jun. 24, 2010

(30) Foreign Application Priority Data
Dec. 18, 2008  (JP) ................................ 2008-321731

(51) Int. Cl.
B60R 21/207   (2006.01)
B60R 21/216   (2011.01)
(52) U.S. Cl. ................ 280/730.2; 280/728.2; 280/743.2
(58) Field of Classification Search ............... 280/728.2, 280/728.3, 730.2, 743.1, 743.2; B62D 21/207, B62D 21/216, 21/2165, 21/2334, 21/2338, B62D 21/2342
See application file for complete search history.

(56) References Cited

U.S. PATENT DOCUMENTS

| | | | | |
|---|---|---|---|---|
| 5,749,597 A | * | 5/1998 | Saderholm ................. | 280/728.2 |
| 5,762,363 A | * | 6/1998 | Brown et al. ............... | 280/730.2 |
| 5,810,389 A | * | 9/1998 | Yamaji et al. ............... | 280/730.2 |
| 5,927,749 A | * | 7/1999 | Homier et al. ............. | 280/730.2 |
| 5,988,674 A | * | 11/1999 | Kimura et al. .............. | 280/730.2 |
| 6,045,151 A | * | 4/2000 | Wu ............................ | 280/728.3 |
| 6,074,003 A | * | 6/2000 | Umezawa et al. .......... | 297/216.1 |
| 6,206,466 B1 | * | 3/2001 | Komatsu ................... | 297/216.13 |
| 6,213,498 B1 | * | 4/2001 | Ghalambor et al. ....... | 280/730.2 |
| 6,352,304 B1 | * | 3/2002 | Sorgenfrei ................ | 297/216.13 |
| 6,357,789 B1 | * | 3/2002 | Harada et al. .............. | 280/730.2 |
| 6,386,577 B1 | * | 5/2002 | Kan et al. ................... | 280/730.2 |
| 6,450,528 B1 | * | 9/2002 | Suezawa et al. ........... | 280/730.2 |

(Continued)

FOREIGN PATENT DOCUMENTS
GB    2410011    7/2005
(Continued)

OTHER PUBLICATIONS

ISA Germany, Search Report of EP 09 01 5006, Jan. 29, 2010, Germany, 7 pages.

*Primary Examiner* — Paul N Dickson
*Assistant Examiner* — Laura Freedman
(74) *Attorney, Agent, or Firm* — Alleman Hall McCoy Russell & Tuttle LLP

(57) ABSTRACT

A side airbag unit disposed in a side support of a seat capable of absorbing collision energy sufficiently during a side collision of a vehicle is described. In one example, the airbag unit comprises: a low expansion member disposed inside of a front skin of the seat, wherein one end of the low expansion member is attached to the inside of the front skin in the vicinity of a fragile part of the seat and the other end of the low expansion member is attached to the seatback frame through a slit. The low expansion member inhibits the front skin from expanding due to the inflation of the airbag, and a cushion pad located outside of the slit in the vehicle width direction and inside of the fragile part in the vehicle width direction is moved outward and frontward by the inflation of the airbag in a vehicle collision.

9 Claims, 12 Drawing Sheets

1···SEAT FOR VEHICLE 1a···SIDE AIRBAG STRUCTURE FOR SEAT 10···SEAT BACK 10a···SIDE SUPPORT 24···FIRST PENETRATION SLIT 25···SECOND PENETRATION SLIT 30···SEAT SKIN 32···SIDE FRONT-FACE SKIN 33···SIDE-FACE SKIN 35···FRAGILE PART 41···FRONT LOW-EXPANSION MEMBER 41b, 42b···OUTER END PART 42···SIDE LOW-EXPANSION MEMBER IN···INWARD DIRECTION OUT···OUTWARD DIRECTION

1a···SIDE AIRBAG STRUCTURE FOR SEAT 10···SEAT BACK 10a···SIDE SUPPORT 11···SEAT BACK FRAME 23···SIDE SUPPORT PAD PART 24···FIRST PENETRATION SLIT 25···SECOND PENETRATION SLIT 30···SEAT SKIN 32···SIDE FRONT-FACE SKIN 33···SIDE-FACE SKIN 35···FRAGILE PART 41···FRONT LOW-EXPANSION MEMBER 4 2 ··· SIDE LOW-EXPANSION MEMBER 50···SIDE AIRBAG UNIT F···FORWARD DIRECTION IN···INWARD DIRECTION OUT···OUTWARD DIRECTION

U.S. PATENT DOCUMENTS

| | | | |
|---|---|---|---|
| 6,578,911 B2 * | 6/2003 | Harada et al. | 297/216.13 |
| 7,004,496 B2 * | 2/2006 | Bossecker et al. | 280/730.2 |
| 7,134,685 B2 * | 11/2006 | Panagos et al. | 280/730.2 |
| 7,134,686 B2 * | 11/2006 | Tracht et al. | 280/730.2 |
| 7,195,274 B2 * | 3/2007 | Tracht | 280/728.3 |
| 7,232,150 B2 * | 6/2007 | Nagayama | 280/730.2 |
| 7,281,735 B2 * | 10/2007 | Acker et al. | 280/730.2 |
| 7,284,768 B2 * | 10/2007 | Tracht | 280/730.2 |
| 7,290,791 B2 * | 11/2007 | Tracht | 280/730.2 |
| 7,290,794 B2 * | 11/2007 | Tracht | 280/730.2 |
| 7,311,325 B2 * | 12/2007 | Tracht et al. | 280/730.2 |
| 7,322,597 B2 * | 1/2008 | Tracht | 280/728.3 |
| 7,331,601 B2 * | 2/2008 | Tracht | 280/730.2 |
| 7,334,811 B2 * | 2/2008 | Tracht et al. | 280/728.3 |
| 7,390,015 B2 * | 6/2008 | Tracht | 280/730.2 |
| 7,401,806 B2 * | 7/2008 | Tracht | 280/730.2 |
| 7,458,603 B2 * | 12/2008 | Buono et al. | 280/728.2 |
| 7,556,287 B2 * | 7/2009 | Inoue et al. | 280/730.2 |
| 7,597,351 B2 * | 10/2009 | Kashiwagi | 280/730.2 |
| 7,637,529 B2 * | 12/2009 | Tracht | 280/728.3 |
| 7,669,889 B1 * | 3/2010 | Gorman et al. | 280/730.2 |
| 7,677,594 B2 * | 3/2010 | Hazlewood et al. | 280/728.2 |
| 7,681,907 B2 | 3/2010 | Svenbrant et al. | |
| 2006/0113763 A1 * | 6/2006 | Tracht et al. | 280/730.2 |
| 2006/0113764 A1 * | 6/2006 | Tracht | 280/730.2 |

FOREIGN PATENT DOCUMENTS

| | | |
|---|---|---|
| JP | 09323609 | 12/1997 |
| JP | 11-124001 | 5/1999 |
| JP | 2000-016223 | 1/2000 |

* cited by examiner

11···SEAT BACK FRAME
41···FRONT LOW-EXPANSION MEMBER
41a···INNER END PART
42···SIDE LOW-EXPANSION MEMBER
50···SIDE AIRBAG UNIT
52···AIRBAG
F···FORWARD DIRECTION

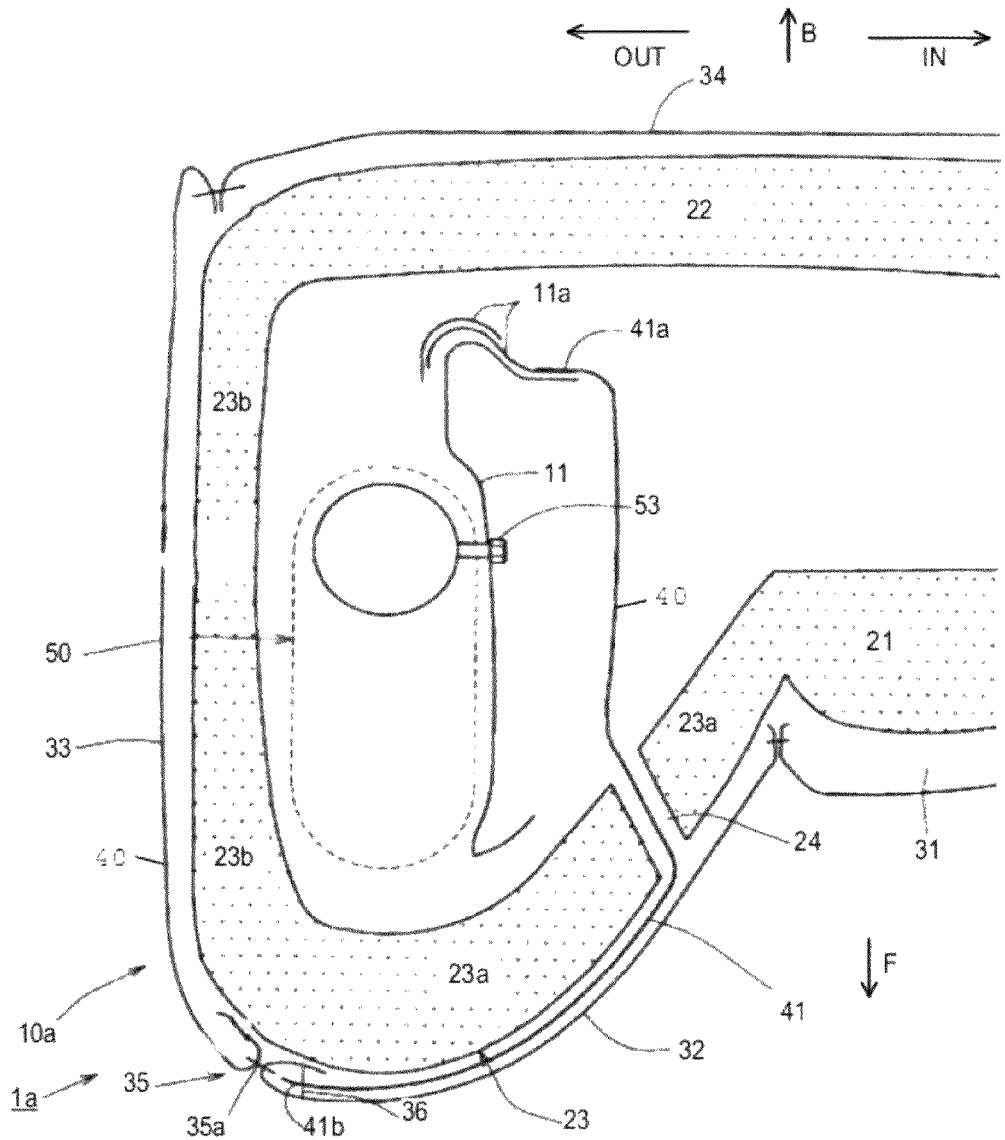

1a···SIDE AIRBAG STRUCTURE FOR SEAT  10a···SIDE SUPPORT  11···SEAT BACK FRAME  23···SIDE SUPPORT PAD PART  23b···SIDE-FACE SUPPORT PAD PART  24···FIRST PENETRATION SLIT  25···SECOND PENETRATION SLIT  32···SIDE FRONT-FACE SKIN  33···SIDE-FACE SKIN  35···FRAGILE PART  41···FRONT LOW-EXPANSION MEMBER  41a···INNER END PART  41b, 42b···OUTER END PART  42···SIDE LOW-EXPANSION MEMBER  50···SIDE AIRBAG UNIT  F···FORWARD DIRECTION  IN···INWARD DIRECTION  OUT···OUTWARD DIRECTION

FIG. 11

SIDE AIRBAG STRUCTURE

FIELD OF THE INVENTION

This invention relates to a side airbag structure equipped with a seat for a vehicle.

BACKGROUND

It has been known that a side airbag structure is equipped with a seat, wherein an airbag is disposed in a side support that is provided in a side portion of a seatback of the seat. The airbag is designed to inflate during side collision of a vehicle so as to absorb collision energy generated during the side collision of the vehicle, which may result in protecting a chest and a waist of a passenger of the vehicle.

In this type of side airbag structure, the airbag is required to cleave the side support in the instant of a collision and to inflate as quickly as possible, without deteriorating a feeling of sitting for the passenger in normal condition (excluding the collision of the vehicle).

For this reason, Japanese Unexamined Patent Application Publication No. 11-124001 discloses a side airbag structure having a low expansion strip disposed inside of a extensile seat skin and extending from rear to side of a seatback of the seat, wherein one end of the low expansion strip is attached to the inside of the seat skin in the vicinity of a seam and the other end of the low expansion strip is attached to a seatback frame of the seatback. Therefore, expansion of the seat skin along the rear and the side of the seatback can be inhibited by the low expansion strip.

Thereby, the seat for the vehicle having the side airbag structure disclosed in the Japanese Unexamined Patent Application Publication No. 11-124001 can be prevented from deteriorating the feeling of sitting for the passenger in normal condition (excluding the collision of the vehicle). In the case of a side collision of the vehicle, the side airbag structure can make the airbag cleave the side support in the instant of the collision and inflate the airbag as quickly as possible.

Further, Japanese Unexamined Patent Application Publication No. 2000-16223 also discloses a side airbag structure having a low expansion strip disposed inside of a seat skin, wherein one end of the low expansion strip is attached to the inside of the seat skin in the vicinity of a seam and the other end of the low expansion strip is attached to a seatback frame of the seatback. Therefore, expansion of the seat skin along the rear and the side of the seatback can be inhibited by the low expansion strip. Also, a side airbag unit is disposed so as to inflate the airbag outward and frontward. Further, a notch is provided inside of the cushion pad of the seatback presented in an inflation direction of the airbag.

Thereby, the seat for the vehicle having the side airbag structure disclosed in the Japanese Unexamined Patent Application Publication No. 2000-16223 can be prevented from deteriorating the feeling of sitting for the passenger in normal condition (excluding the collision of the vehicle). In the case of a side collision, the side airbag structure can make the airbag cleave the notch in the instant of the collision and inflate the airbag in the outward and frontward direction as quickly as possible.

Although these side airbag structures can inflate the airbag quickly, the notch and/or the cushion pad will be cleaved after the cushion pad has been compressed between the airbag and the seat skin during inflation of the airbag. Therefore, the cushion pad in compressed state may crash into the passenger of the vehicle, which disadvantageously may not result in absorbing the collision energy sufficiently by the airbag during a side collision of the vehicle.

This invention is made so as to address this problem. A purpose of this invention is to provide a side airbag structure equipped with a seat that is capable of absorbing the collision energy sufficiently during a side collision of the vehicle. This may be achieved by diminishing the volume of the cushion pad put and compressed between the airbag and the passenger when the inflating airbag crashes into the passenger.

SUMMARY

To achieve the above purpose, in accordance with an aspect of the invention, a side airbag structure equipped with a seatback of a seat for a vehicle, comprises: a side support provided outside of the seatback in a vehicle width direction, wherein the side support is capable of supporting a passenger of the vehicle; a side airbag unit disposed in the side support and attached to a seatback frame of the seatback, wherein the side airbag unit includes an airbag that inflates frontward in a vehicle collision; a cushion pad covering at least a front side of the side airbag unit; a seat skin enveloping the side airbag unit and the cushion pad; a first fragile part provided on the seat skin, wherein the first fragile part is cleaved by an inflation of the airbag and allows the airbag to deploy through the cleaved first fragile part and out of the seat skin; and a first slit provided on the cushion pad in the side support and inside of the first fragile part in the vehicle width direction, wherein the first slit passes through the cushion pad in a vehicle longitudinal direction; wherein the seat skin includes a front skin covering a front side of the cushion pad at least between an inner end of the side support in the vehicle width direction and the first fragile part, a first low expansion member is disposed inside of the front skin, wherein one end of the first low expansion member is attached to the inside of the front skin in the vicinity of the first fragile part and the other end of the first low expansion member is attached to the seatback frame through the first slit, so that the first low expansion member inhibits the front skin from expanding due to the inflation of the airbag, and the cushion pad located outside of the first slit in the vehicle width direction and inside of the first fragile part in the vehicle width direction is moved outward and frontward by the inflation of the airbag in a vehicle collision.

Preferably, the first low expansion member may be a flexible sheet or a flexible strip.

According to the above configuration, the cushion pad located outside of the first slit in the vehicle width direction and inside of the first fragile part in the vehicle width direction may be moved outward and frontward (i.e. in a direction away from the passenger in a top view) when the airbag is deployed through the cleaved first fragile part in a vehicle collision. Such a configuration can prevent the compressed cushion pad from being put between the inflated airbag and the passenger, which may advantageously result in absorbing the collision energy sufficiently by the airbag during the side collision of the vehicle.

Preferably, the first slit may be configured so that the volume of the cushion pad located outside of the first slit (or the first low expansion member) in the vehicle width direction (i.e. the cushion pad that is moved outward and frontward when the airbag is deployed in a vehicle collision) is larger than the volume of the cushion pad located inside of the first slit (or the first low expansion member) in the vehicle width direction.

In a preferable embodiment, the cushion pad may not be disposed outside of the side airbag unit in the vehicle width direction.

According to this embodiment, the weight of the cushion pad that will be moved by the inflation of the airbag can be diminished, because the cushion pad (that is moved when the airbag is deployed) is not provided behind the inflating airbag in the vehicle longitudinal direction. Therefore, reliability and responsiveness of the airbag deployment in a vehicle collision (e.g. a side collision) can be enhanced, which may advantageously result in protecting a chest and a waist of a passenger of the vehicle by absorbing the collision energy sufficiently by means of the airbag deployed with high responsiveness.

In a preferable embodiment, the airbag may be contained in the side airbag unit with at least a base portion of the airbag accordion-folded.

Preferably, the airbag as above may be contained in the side airbag unit with a base portion of the airbag accordion-folded and with an end portion of the airbag folded to be rolled outward in the vehicle width direction. Alternatively in another preferable embodiment, the airbag as above may be contained in the side airbag unit with the whole airbag accordion-folded.

According to this embodiment, the airbag can be deployed with higher deployment speed as compared to the airbag contained with the whole airbag folded to be rolled, which may result in quickly moving the cushion pad frontward.

In a preferable embodiment, the airbag may be contained in the side airbag unit with the airbag folded to be rolled outward in the vehicle width direction.

According to this embodiment, the airbag can be deployed in the direction of the first slit. Therefore, it can prevent the compressed cushion pad from being put between the inflated airbag and the passenger, which may advantageously result in absorbing the collision energy sufficiently by the airbag during the side collision of the vehicle.

In a preferable embodiment, a second fragile part may be provided on the cushion pad in the vicinity of the at least one of an upper end and a lower end of the first slit, wherein the second fragile part may extend substantially in the vehicle width direction.

Preferably, the second fragile part may extend in the right-angle direction to the first slit in the vicinity of the at least one of an upper end and a lower end of the first slit.

Alternatively, the second fragile part may extend in the obliquely vertical direction toward the vehicle width direction in the vicinity of the at least one of an upper end and a lower end of the first slit.

Preferably, the second fragile part may be formed by cutting the cushion pad in the shape of a dashed line. Alternatively, the second fragile part may be a thin-walled part of the cushion pad with a thickness that is less (e.g. about half) than the other part of the cushion pad. Alternatively, the second fragile part may be a low-strength part of the cushion pad whose tear strength is less than the other part of the cushion pad.

According to this embodiment, the cushion pad may be cleaved securely at the second fragile part by the inflation of the airbag. Therefore, the cushion pad located outside of the first slit in the vehicle width direction and inside of the first fragile part in the vehicle width direction can be moved outward and frontward in a vehicle collision.

Accordingly, it can securely prevent the compressed cushion pad from being put between the inflated airbag and the passenger, which may advantageously result in absorbing the collision energy sufficiently by the airbag during the side collision of the vehicle.

In a preferable embodiment, a plurality of notches may be provided on the cushion pad in the side support and inside of the first fragile part in the vehicle width direction so that the plurality of notches are lined up in a vertical direction; wherein the first slit may be composed of at least one of the notches.

Preferably, the notches may be slits that pass through the cushion pad. Alternatively, the notches may be thin-walled parts of the cushion pad with thicknesses of less (e.g. about half) than the other parts of the cushion pad.

According to this embodiment, the cushion pad located outside of the first slit in the vehicle width direction and inside of the first fragile part in the vehicle width direction can be securely moved outward and frontward in a vehicle collision, without deteriorating a feeling of sitting for the passenger in normal condition (excluding the collision of the vehicle). Specifically, in the case that the first slit is formed as one long slit extending in a vertical direction, a cushion property of the seatback may be deteriorated, which may disadvantageously result in deteriorating the feeling of sitting for the passenger in normal condition (excluding the collision of the vehicle).

However, lining up the plurality of notches in the vertical direction can prevent the cushion pad from forming a level difference on the border of the notches inside of the seat skin. Therefore, the cushion pad located outside of the first slit in the vehicle width direction and inside of the first fragile part in the vehicle width direction can be securely moved outward and frontward in a vehicle collision, without deteriorating a feeling of sitting for the passenger (i.e. an uncomfortable feeling of the level difference of the cushion pad that the passenger has through the seat skin) in normal condition (excluding the collision of the vehicle).

In a preferable embodiment, the seat skin may include a side skin that covers the cushion pad at least between a side end of the side support in the vehicle width direction and the first fragile part, and a second low expansion member may be disposed inside of the side skin, wherein one end of the second low expansion member may be attached to the inside of the side skin in the vicinity of the first fragile part and the other end of the second low expansion member may be attached to the seatback frame.

According to this embodiment, both the first low expansion member and the second expansion member can prevent the seat skin (i.e. the front skin and the side skin) from expanding due to the inflation of the airbag, which may advantageously result in cleaving the first fragile part by the inflation of the airbag so as to securely deploy the airbag.

In a preferable embodiment, a second slit may be provided on the cushion pad and behind the first fragile part in the vehicle longitudinal direction, wherein the second slit may allow the second low expansion member to pass through the cushion pad in the vehicle width direction.

According to this embodiment, the cushion pad between the first slit and the second slit can be moved frontward during the deployment of the airbag. By adjusting deploying pressure of the airbag and/or tear strength of the cushion pad appropriately, a part of the cushion pad disposed frontward of the side airbag unit can be separated from the other part of the cushion pad with the first slit and the second slit, which may result in moving the cushion pad between the first slit and the second slit frontward due to the inflation of the airbag.

Therefore, it can securely prevent the compressed cushion pad from being put between the inflated airbag and the passenger, which may advantageously result in absorbing the collision energy sufficiently by the airbag during a side collision of the vehicle. Further, the weight of the cushion pad that will be moved by the inflation of the airbag can be diminished, due to the existence of the second slit. Therefore, reliability and responsiveness of the airbag deployment in a vehicle collision (e.g. a side collision) can be enhanced, which may advantageously result in protecting a chest and a waist of a passenger of the vehicle by absorbing the collision energy sufficiently by means of the airbag deployed with high responsiveness.

According to the invention, the cushion pad located outside of the first slit in the vehicle width direction and inside of the first fragile part in the vehicle width direction may be moved outward and frontward (i.e. in a direction apart from the passenger in a top view) when the airbag is deployed through the cleaved first fragile part in a vehicle collision. Therefore, it can prevent the compressed cushion pad from being put between the inflated airbag and the passenger, which may advantageously result in absorbing the collision energy sufficiently by the airbag during the side collision of the vehicle.

BRIEF DESCRIPTION OF THE DRAWINGS

FIG. 11 is a schematic view of an airbag according to another embodiment of the invention.

DETAILED DESCRIPTION

Hereafter, several embodiments of the invention will be described in detail referring to the appended drawings.

Embodiment 1

Figure 1:
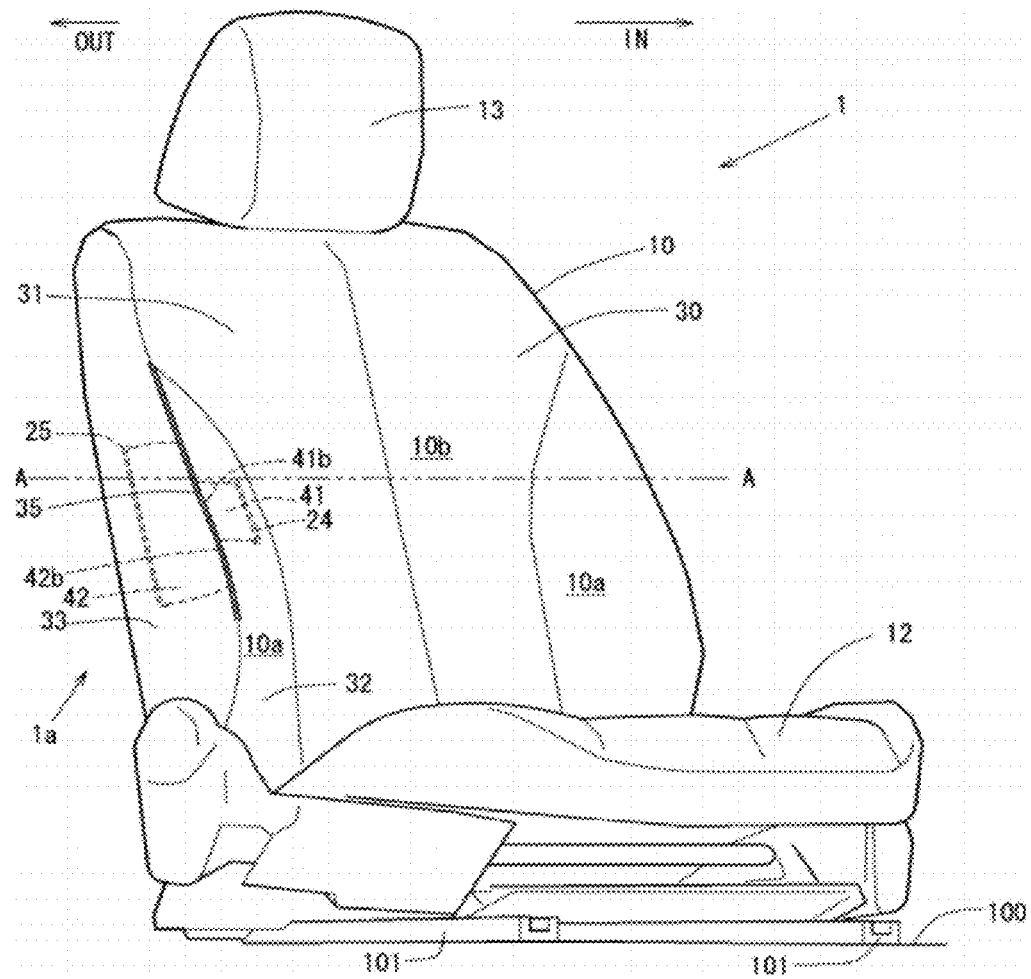
FIG. 1 is a perspective view of a seat for a vehicle equipped with a side airbag structure for the seat according to an embodiment of the invention.
Figure 2:
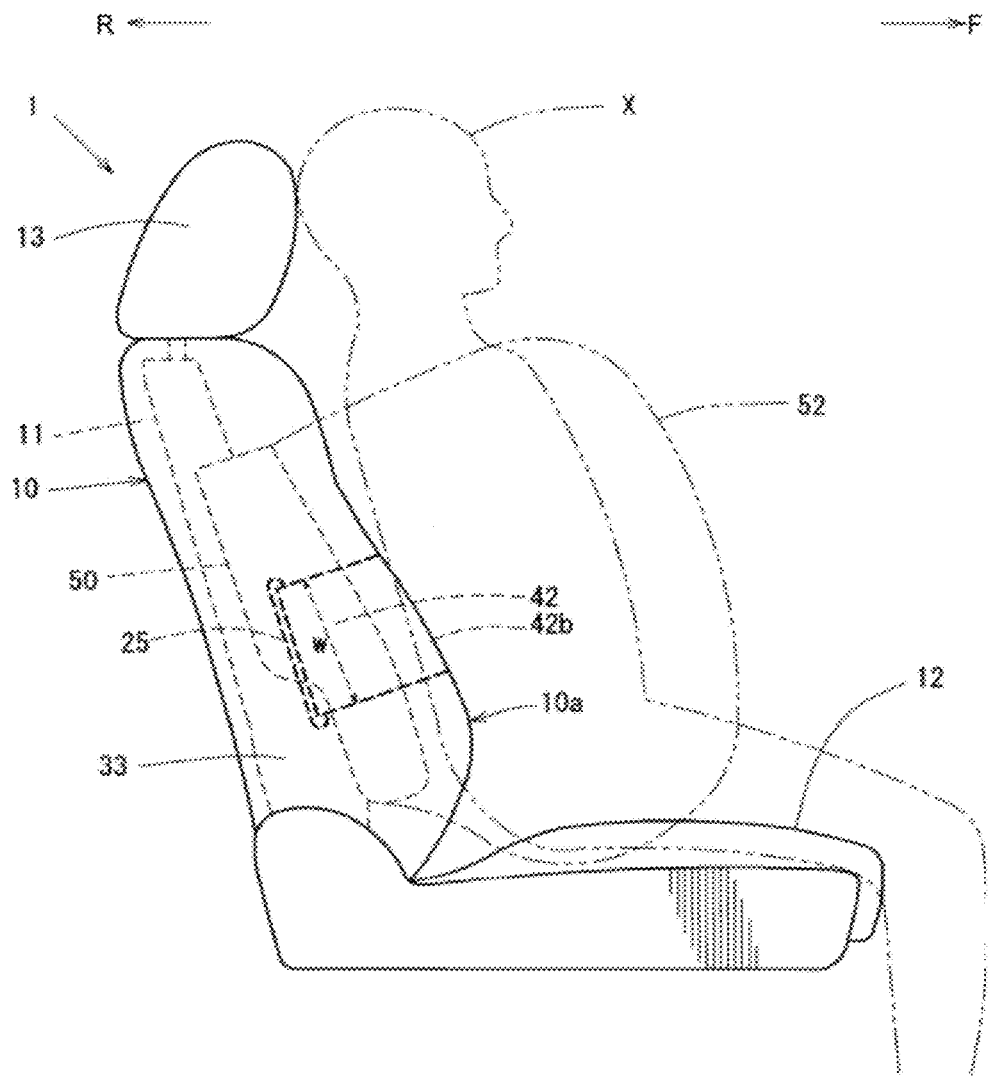
FIG. 2 is a side view of the seat for the vehicle equipped with the side airbag structure for the seat.
Figure 3:
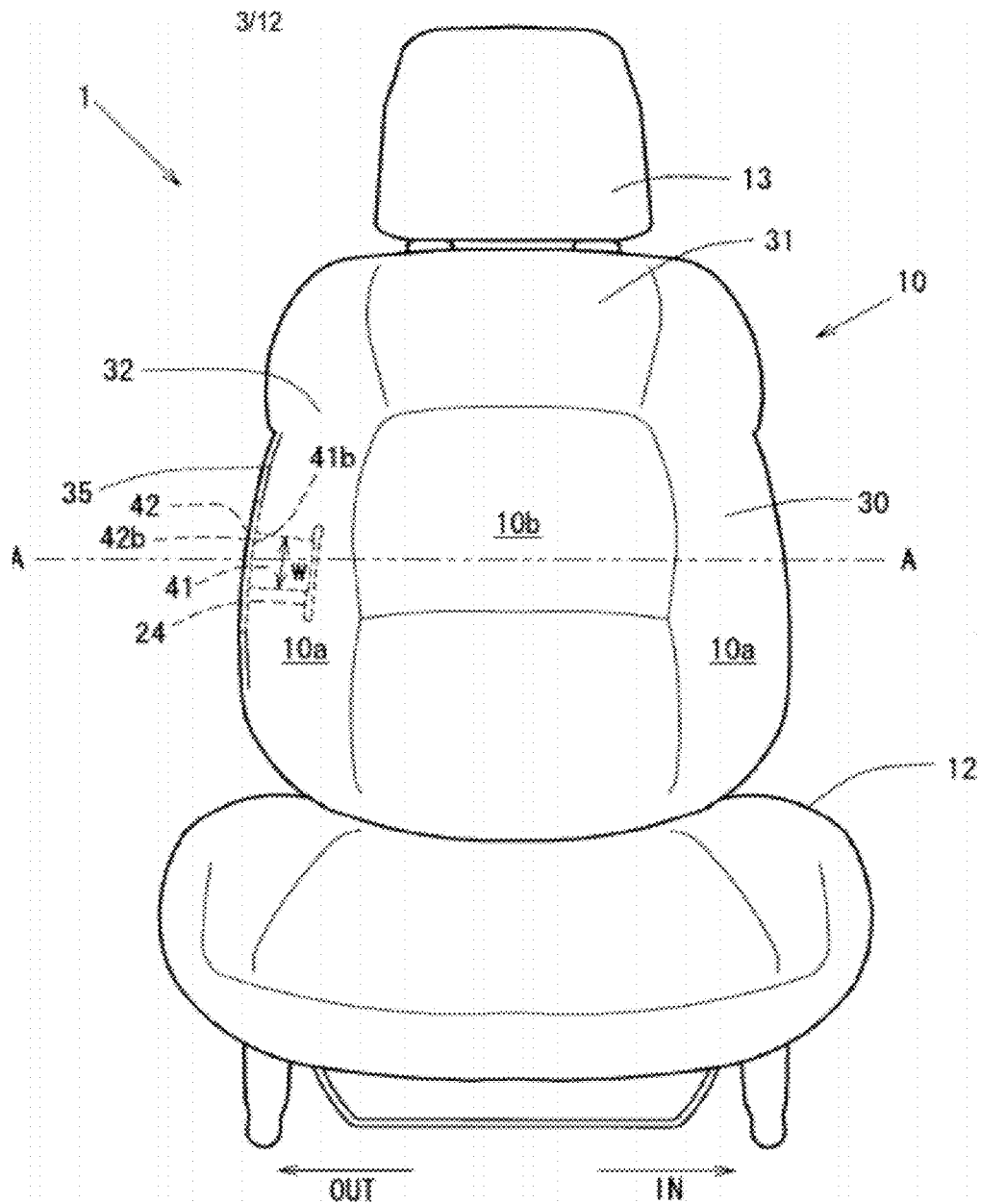
FIG. 3 is a front view of the seat for the vehicle equipped with the side airbag structure for the seat.
Figure 4:
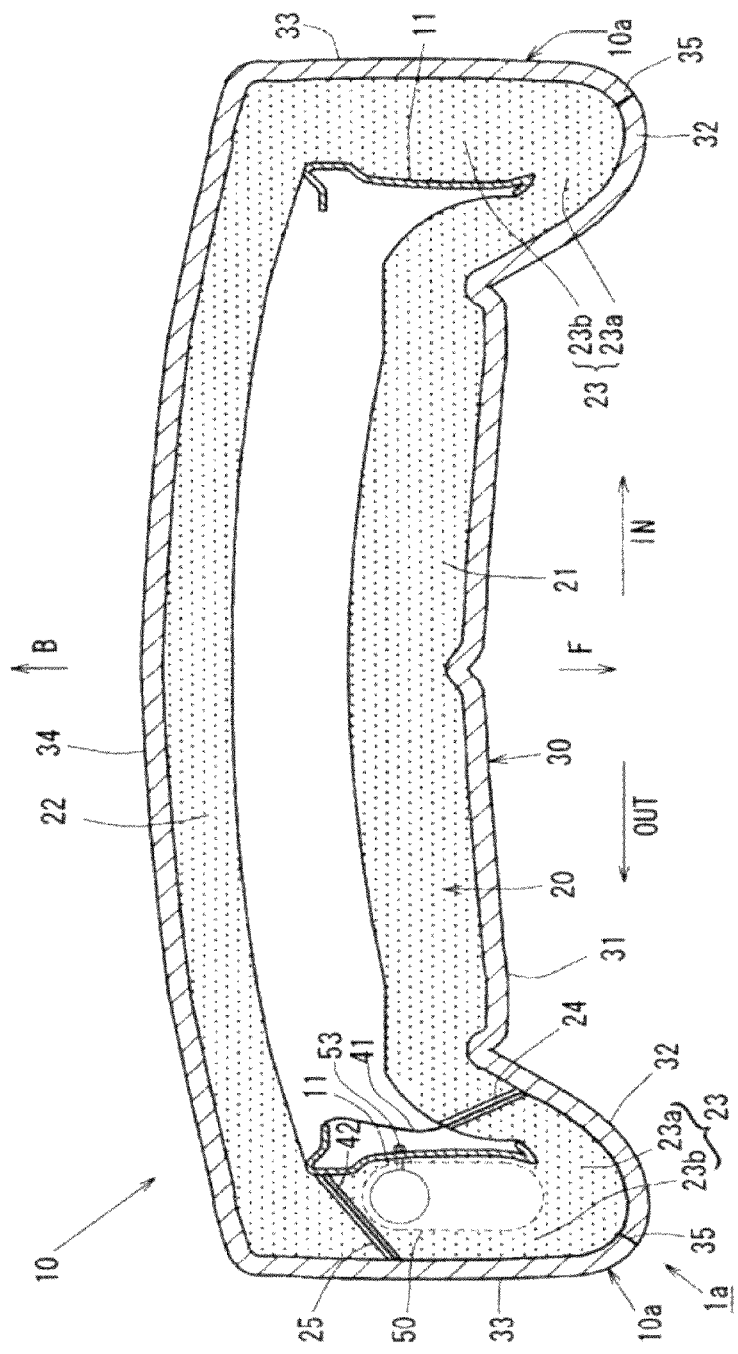
FIG. 4 is a cross-sectional view taken along the line A-A which is at near the center of a seat back in its height direction.
Figure 5:
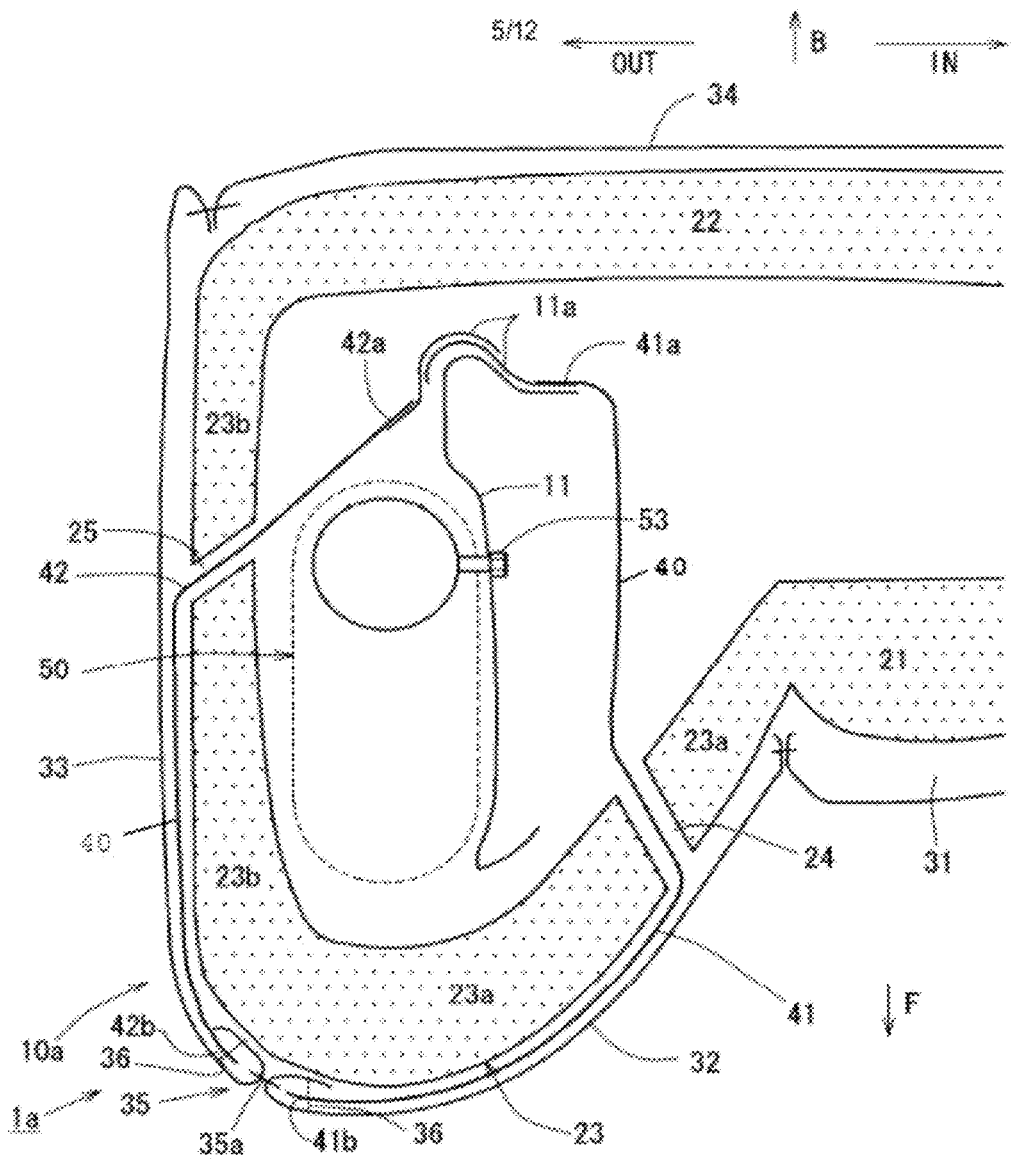
FIG. 5 is an enlarged cross-sectional view of FIG. 4 taken along the line A-A, showing the vicinity of a side support.
Figure 6A:
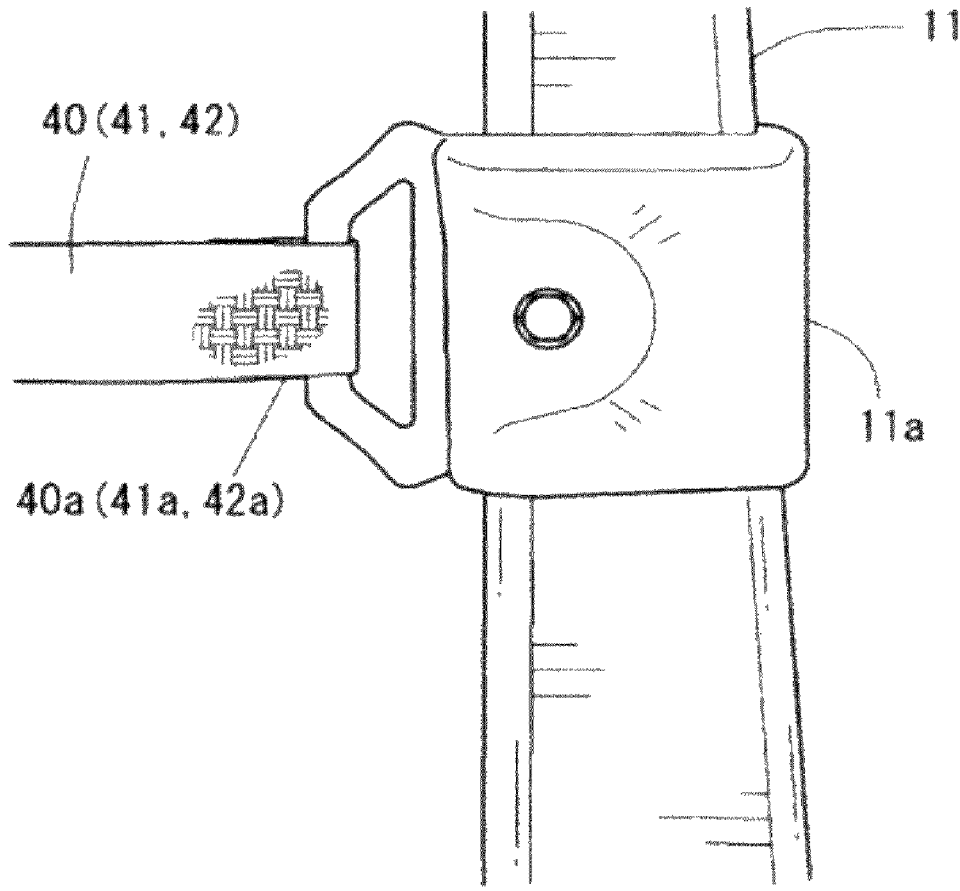
FIGS. 6A-6C are schematic views of a side airbag unit.
Figure 6B:
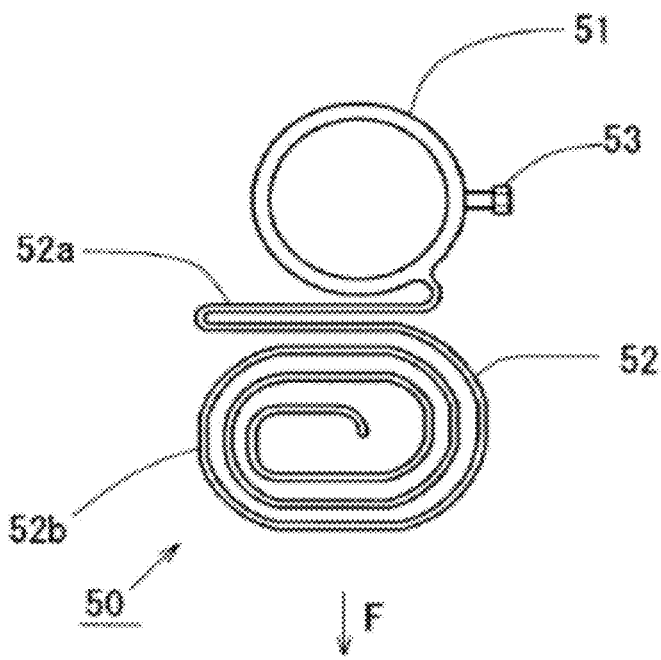
Figure 6C:
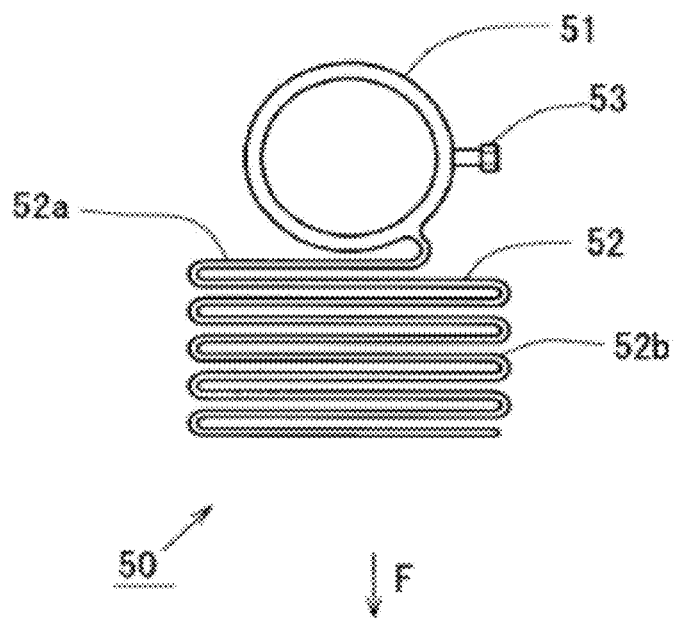
Figure 7:
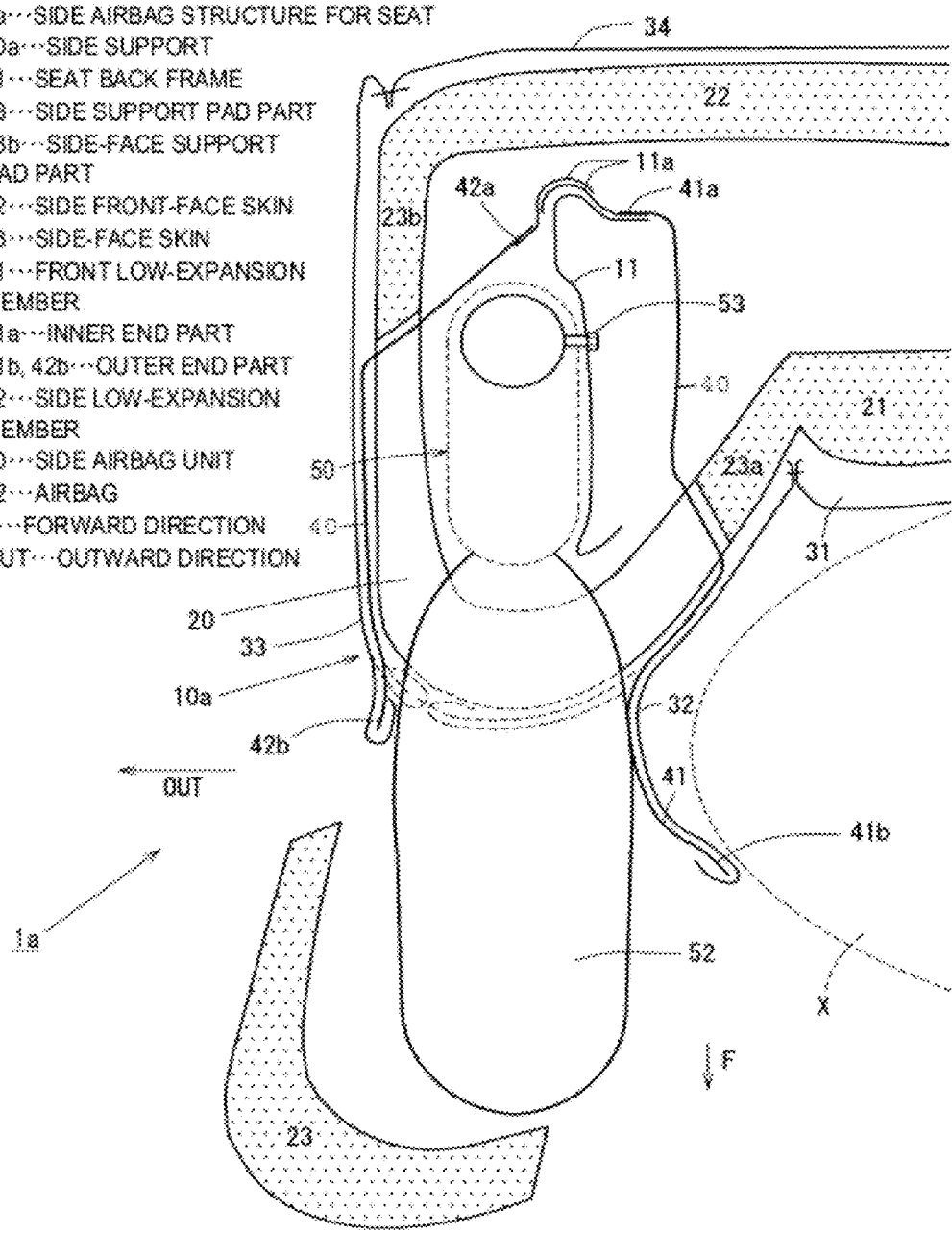
FIG. 7 is a schematic view of the airbag when inflated.

FIG. 1 shows a perspective view of a seat 1 for a vehicle equipped with a side airbag structure 1a for the seat according to an embodiment of the invention. FIG. 2 is a side view of the vehicle seat 1. FIG. 3 shows a front view of the vehicle seat 1. FIG. 4 shows a cross-sectional view taken along the line A-A which is located near the center of a seat back 10 of the seat in its height direction. FIG. 5 shows an enlarged cross-sectional view taken along the line A-A, which shows the vicinity of a side support 10a. FIGS. 6A-6C show schematic views of a side airbag unit 50. FIG. 7 shows a schematic view of an airbag 52 when inflated.

Note that, in the figures above, an arrow (F) indicates forward, and an arrow (B) indicates backward, with respect to the location concerned in the vehicle, respectively. Further, an arrow (IN) indicates inward, and an arrow (OUT) indicates outward, with respect to the location concerned in the vehicle width direction, respectively.

Note that this embodiment is described regarding an automobile having a driver's seat on the right side. Therefore, it should be noted that this right-side structure is symmetrical to an automobile having the driver's seat on the left side.

The side airbag structure 1a for the seat 1 includes the side airbag unit 50 described later in detail, a penetration slit formed in a cushion pad 20, and a fragile part 35 constituted by a part of stitches in the up-and-down direction in a seat skin 30 covering the cushion pad 20, and a low expansion member 40 passing through the penetration slit and fixed to the seat skin 30 in the vicinity of the fragile part 35.

More specifically, as shown in FIGS. 1 to 3, the vehicle seat 1 which is the driver's seat in which a person on board X who drives sits, includes a seat cushion 12 fixed to a floor panel 100 via a pair of slide rails 101, and the seat back 10 fixed behind the seat cushion 12 via a reclining mechanism and provided with a headrest 13 in its upper part.

A seat back frame 11 is formed in a gate shape in the front view so that it extends in the up-and-down direction and in the seat front-and-rear direction. A longitudinal part of the seat back frame 11 is arranged in each of the left-and-right side parts inside the seat back 10, respectively (refer to FIG. 2).

A pair of side supports 10a are formed in the left-and-right side parts of the seat back 10 so as to extend in the up-and-down direction. Each side support 10a protrudes forward (F) from the left or right edge of a seat back part 10b which is located at the center of the seat back in the vehicle width direction. In the seat side view (refer to FIG. 2), the front end of each side support 10a is formed in a curved shape in which an intermediate part in the up-and-down direction has a greater distance from the rear end of the seat back frame 11 than its upper and lower end parts.

Further, in the lateral cross-sectional view of the seat back 10 (refer to FIG. 4), each side support 10a is formed in a curved surface shape in which a protruded amount to the front from the seat back part 10b becomes greater as it goes from the center to the outside in the vehicle width direction.

The seat back 10 includes the seat back frame 11 having the gate shape in the front view, the cushion pad 20 forming the seat back shape and the side support shape, the seat skin 30 covering the cushion pad 20; and the side airbag unit 50 accommodating therein the airbag 52 that deploys from its folded state and attached to a side part of the seat back frame 11 located outwardly (OUT).

The cushion pad 20 is formed of a sponge having a relatively high degree of hardness, and has a gate shape in the front view so as to surround the seat back frame 11 having a similar shape. The cushion pad 20 integrally forms a front center pad part 21 that constitutes the seat back part 10b opposed to the back of the person on board X who seats forward (F) of the seat back frame 11, a back-face pad part 22 located backwardly (B) from the seat back frame 11, and a pair of side support pad parts 23 each constituting a part of each side support 10a together with a corresponding side part of the front center pad part 21 and a corresponding side part of the back-face pad part 22.

Further, each side support pad part 23 includes a front support pad part 23a on the front and inner side, which is opposed to a corresponding side part of the back of the seated person on board X, and a side-face support pad part 23b that forms a side part of the corresponding side support 10a.

A first penetration slit 24, which permits passage of a front low-expansion member 41 described later, is provided to the front support pad part 23a, and a second penetration slit 25, which permits passage of a side low-expansion member 42 described later, is provided to the side-face support pad part 23b.

More specifically, the first penetration slit 24 is arranged in the front support pad part 23a inwardly (IN) near the front center pad part 21, and is a slit elongated in the up-and-down direction which penetrates the front (F) side of the front support pad part 23a and the inside part of the vehicle seat 1 in the forward and rear direction.

The second penetration slit 25 is a slit elongated in the up-and-down direction which penetrates the side-face support pad part 23b obliquely inwardly and rearwardly from the vicinity of the center of the side-face support pad part 23b in the depth direction (i.e., in the front-and-rear direction).

The seat skin 30 covering the outer face of the cushion pad 20 is formed of an extensible fabric. The seat skin 30 includes a center front-face skin 31 that covers a front face of the front center pad part 21, a pair of side front-face skins 32 each covering an inward part of the front face of the side support pad part 23, a pair of side side-face skins 33 each covering the side part of the side support pad part 23, and a back-face skin 34 that covers the back face of the back-face pad part 22. A boundary part of each pad part is integrated by stitches extending in the longitudinal direction.

More specifically, as shown in FIG. 5, an end part of each skin is folded, and the folded peak abuts on an adjacent folded peak. Their boundary part is stitched with threads 35a.

Note that, among the boundary parts extending in the vertical direction, a part of the stitches near the center in the height direction which is located at the boundary part between the side front-face skin 32 and the side side-face skin 33 is referred to as the "fragile part 35." This fragile part 35 is stitched by a stitching method of a weaker stitching strength compared with the stitches of other boundary parts.

The low expansion member 40 is a low-extensible belt body formed of chemical fibers. An inner end part 41a, which is one end part of the belt, is fixed to the seat back frame 11 inside the vehicle seat 1 with a bracket 11a. An outer end part 41b, which is the other end of the belt, is fixed to the seat skin 30 in the vicinity of the fragile part 35 after being passed through the penetration slits.

More specifically, the low expansion member 40 includes a front low-expansion member 41 arranged forward inside the side support 10a, and a side low-expansion member 42 arranged to the side of the side support 10a. A length of the side low-expansion member 42 in the up-and-down direction (i.e., a width w of the side low-expansion member 42 formed in the belt-shape, as shown in FIG. 2) is set approximately three times greater than a width w of the front low-expansion member 41 shown in FIG. 3.

As shown in FIGS. 5 and 6A, the front low-expansion member 41 is fixed at its inner end part 41a to the seat back frame 11 with the bracket 11 a. The inner end part 41a passes through the inside (IN) of the seat back frame 11 and through the first penetration slit 24, and is arranged between the side support pad part 23 and the side front-face skin 32. The outer end part 4 lb is arranged inside of the folded part of the fragile part 35 of the side front-face skin 32, and is fixed by the fixing thread 36.

As also shown in FIGS. 5 and 6A, the side low-expansion member 42 is fixed at its inner end part 42a to the seat back frame 11 with the bracket 11a. The inner end part 42a passes outward (OUT) of the seat back frame 11 through the back side (B) of the side airbag unit 50 and through the second penetration slit 25, and is arranged between the side support pad part 23 and the side side-face skin 33. The outer end part 42b is arranged inside of the folded part of the fragile part 35 of the side side-face skin 33, and is fixed by the fixing thread 36.

The side airbag unit 50 is fixed to the outside (OUT) of the seat back frame 11 with a fixing bolt 53, and accommodates an inflator 51 (refer to FIG. 6B) and the airbag 52 that inflates forward (F) by a gas generated by the inflator 51.

As shown in FIG. 6B, the airbag 52 is folded in an accordion shape at its airbag base end 52a which is on the side of the inflator 51. A tip part 52b of the airbag 52 that inflates forward (F) is roll-folded to be accommodated in the side airbag unit 50. Alternatively, as shown in FIG. 6C, the airbag 52 may be accommodated in the side airbag unit 50 after its airbag base end 52a and the entire tip part 52b are folded in an accordion shape.

When a side collision occurs to the vehicle having the seat 1 for the vehicle equipped with the side airbag structure 1a for the seat configured as described above, an explosive inside the inflator 51 of the side airbag unit 50 explodes to inflate the airbag 52 forward (F) by the gas generated by the explosion. Therefore, the deployed airbag 52 absorbs the energy of the vehicle side collision to protect the chest and waist of the person on board X.

The deployment of the airbag 52 at this time is explained in more detail. The airbag 52, which inflates by the explosion in the inflator 51, inflates to push off the front support pad part 23a which is located forward (F). This is the inflating direction by the deployment pressure.

The front of the front support pad part 23a is covered with the side front-face skin 32, and the side of the side-face support pad part 23b is covered with the side side-face skin 33. Therefore, the deployment pressure of the airbag 52 is applied to both the side front-face skin 32 and the side side-face skin 33. However, because the side front-face skin 32 and the side side-face skin 33 are formed by an extensible fabric to secure comfortableness of the person on board X who is seated in the seat 1 for the vehicle, they will extend even when the deployment pressure of the airbag 52 is applied.

Thus, the low expansion member 40 having low extensibility, in which its inner end part 41a is fixed to the seat back frame 11 and its outer end part 41b is fixed to the seat skin 30 in the vicinity of the fragile part 35, is arranged inside the side front-face skin 32 and the side side-face skin 33. Therefore, the deployment pressure of the airbag 52 will be applied to the low expansion member 40.

Thus, because the low expansion member 40 to which the deployment pressure of the airbag 52 is applied has the low extensibility, it allows the deployment pressure to be applied to the fragile part 35 allowing the fragile part 35 to break open without reducing the deployment pressure. Then, as shown in FIG. 7, the airbag 52 inflates forward (F). When the airbag 52 inflates, the side support pad part 23 between the first penetration slit 24 and the second penetration slit 25 can be blown away to the front (F) and to the outside (OUT). This direction is away from the seated person on board X (after the side support pad part 23 is deployed to the outside from the fragile part 35).

Therefore, this structure can prevent a problem in which the side support pad part 23 compressed by the deployment pressure of the airbag 52 is caught between the inflated airbag 52 and the person on board X so that the energy of the vehicle side collision cannot fully be absorbed by the airbag 52.

In the low expansion member 40 capable of applying the deployment pressure of the airbag 52 to the fragile part 35 without reducing the deployment pressure, the side low-expansion member 42 is formed so that its width w is greater than the width w of the front low-expansion member 41. As compared with the case where the front low-expansion member 41 and the side low-expansion member 42 are formed with the same width w, the stress concentration can be produced to the fragile part 35 by the deployment pressure of the airbag 52. Therefore, the fragile part 35 can be broken open more efficiently when inflating the airbag 52.

A part of the cushion pad 20 located outward (OUT) from the first penetration slit 24 moves forward (F) and outward (OUT) which is a direction away from the person on board X when the airbag 52 breaks open and deploys from the fragile part 35. The part of the cushion pad 20 located outward (OUT) from the first penetration slit 24 may have more volume than the other part of the cushion pad 20 located inward (IN) from the front low-expansion member 41. In order to prevent the cushion pad 20 from being caught between the deployed airbag 52 and the person on board X, and in order to fully absorb the energy of the vehicle side collision by the airbag 52, the first penetration slit 24 may be preferably arranged in the side support pad part 23 inwardly (IN) from the fragile part 35, whereby the front low-expansion member 41 passes through the first penetration slit 24.

Further, because the second penetration slit 25 is arranged in the side-face support pad part 23b of the side support pad part 23 and passes through the side low-expansion member 42, the extension of the side front-face skin 32 and the side side-face skin 33 by the deployment pressure of the airbag 52 can be efficiently suppressed by the front low-expansion member 41 and the side low-expansion member 42.

Further, the side support pad part 23 between the first penetration slit 24 and the second penetration slit 25, which may be caught between the front low-expansion member 41 and the side low-expansion member 42, can be easily blown away to the forward (F) and to the outside (OUT) by the deployment pressure of the airbag 52.

Therefore, more certainly, the fragile part 35 can be broken open by the deployment pressure of the airbag 52, and the airbag 52 can then be inflated. Note that, although it has been described that the side support pad part 23 between the first penetration slit 24 and the second penetration slit 25 is blown away when receiving the deployment pressure of the airbag 52 in this embodiment, it may not necessarily be blown away as long as it is deformable to the direction away from the seated person on board X (i.e., to the forward (F) and to the outside (OUT)).

In this embodiment, among the low expansion member 40 formed of the low extensible fabric, the front low-expansion member 41 on the side opposing to the back of the seated person on board X has a width w narrower than the width w of the side low-expansion member 42 arranged in the side part of the seat back 10. Therefore, the deployment pressure of the airbag 52 can be efficiently applied to the fragile part 35 without degrading the seating comfortableness of the person on board X who is seated in the seat 1 for the vehicle, as compared with the case where the width w of the front low-expansion member 41 is made wider.

Further in this embodiment, the airbag 52 is accommodated in the side airbag unit 50 so that the airbag base end 52a is folded in an accordion shape (refer to FIG. 6C). Therefore, it can deploy at a high deployment initial velocity and its deployment direction is easy to be controlled, compared with the airbag 52 accommodated in the side airbag unit 50 so that the entire part is roll-folded (refer to FIG. 6B). Thereby, the airbag 52 can be deployed in the intended direction, and as a result, the side support pad part 23 can be blown away to the forward (F) and to the outside (OUT) which is the intended deployment direction of the airbag 52.

Embodiment 2

In the previous embodiment, the first penetration slit 24 is arranged inwardly (IN) in the front support pad part 23a, and the second penetration slit 25 is arranged at near the center of the side-face support pad part 23b in the depth direction (i.e., in the front-and-rear direction). However, FIG. 8 shows schematic views of some other embodiments where the first penetration slit 24 and/or the second penetration slit 25 may be arranged at different positions.

Figure 8:
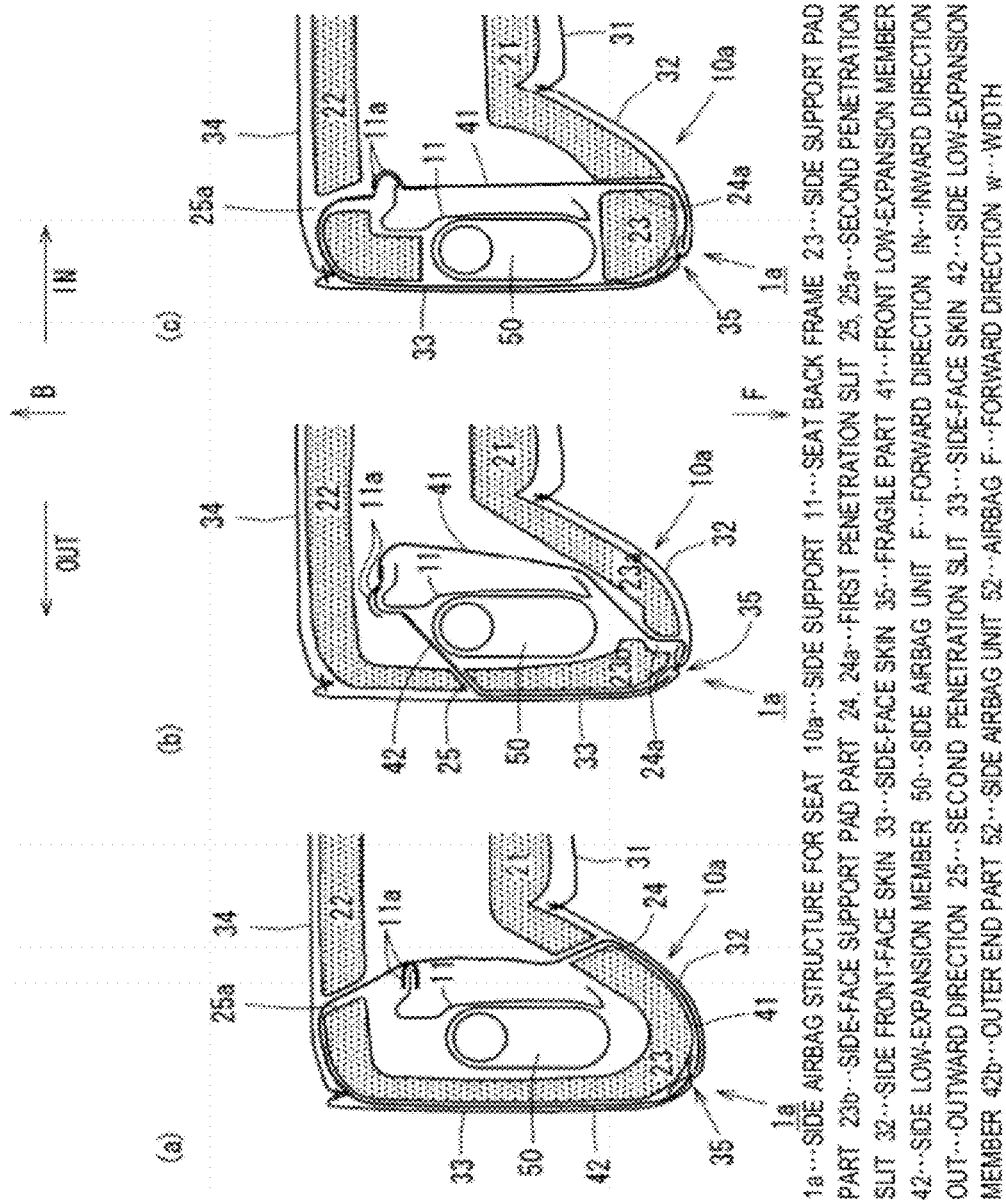
FIG. 8 is schematic views of an airbag according to another embodiment of the invention.

More specifically, as shown in (a) of FIG. 8, the first penetration slit 24 may be arranged inwardly (IN) in the front support pad part 23a similar to the previous embodiment, but the second penetration slit 25a may be arranged in the back-face pad part 22, backward (B) of the seat back frame 11, for example. The side low-expansion member 42 may pass through the second penetration slit 25a, and it may be fixed to the side side-face skin 33 in the vicinity of the fragile part 35 after passing through the outside (OUT) of the support pad part 23 from the back (B) of the back-face pad part 22.

In this case, the entire side support pad part 23 and a part of the back-face pad part 22 on the outside (OUT) will be integrally blown away by the deployment pressure of the airbag 52.

Embodiment 3

Alternatively, for example, as shown in (b) of FIG. 8, the second penetration slit 25 may be arranged in the side part of the side-face support pad part 23b similar to Embodiment 1, but the first penetration slit 24a may be arranged in the front part of the front support pad part 23a slightly inward (IN) from the fragile part 35. In this case, because the side support pad part 23 between the first penetration slit 24a and the second penetration slit 25 will be smaller, it can be blown away easily by the deployment pressure of the airbag 52.

Embodiment 4

Alternatively, for example, as shown in (c) of FIG. 8, the side support pad part 23 may not be arranged outward (OUT) of the side airbag unit 50, in contrast to the first penetration slit 24 and the second penetration slit 25 of the previous embodiments. In this embodiment, the first penetration slit 24a may be arranged in the front part of the front support pad part 23a slightly inwardly (IN) from the fragile part 35, and the second penetration slit 25a may be arranged in the back-face pad part 22 backwardly (B) from the seat back frame 11. In this case, because the side support pad part 23 forward of the side airbag unit 50 will be smaller, it can be blown away easily by the deployment pressure of the airbag 52.

In (c) of FIG. 8, the side part of the side airbag unit 50 on the outside (OUT) is covered with the side side-face skin 33, and a part of the back-face pad part 22 on the backside (B) is covered with the back-face skin 34. However, a part which extends from the side part of the side airbag unit 50 on the outside (OUT) to the part of the back-face pad part 22 on the backside (B) may be integrally covered with a resin plate.

Thus, the configuration is not limited to the previous embodiments. For example, instead of the first penetration slit 24 and the second penetration slit 25, the first penetration slit 24a may be arranged in the front part of the front support pad part 23a slightly inward (IN) from the fragile part 35, and the second penetration slit 25a may be arranged in the back-face pad part 22 backwardly (B) from the seat back frame 11. Therefore, the deployment pressure of the airbag 52 can be efficiently applied to the fragile part 35 to break open the fragile part 35 to deploy the airbag 52. Then, the cushion pad 20 between the first penetration slit 24 (24a) and the second penetration slit 25 (25a) is blown away by the deployment pressure of the airbag 52, and thereby the energy of the vehicle side collision can fully be absorbed by the airbag.

Embodiment 5

Figure 9:
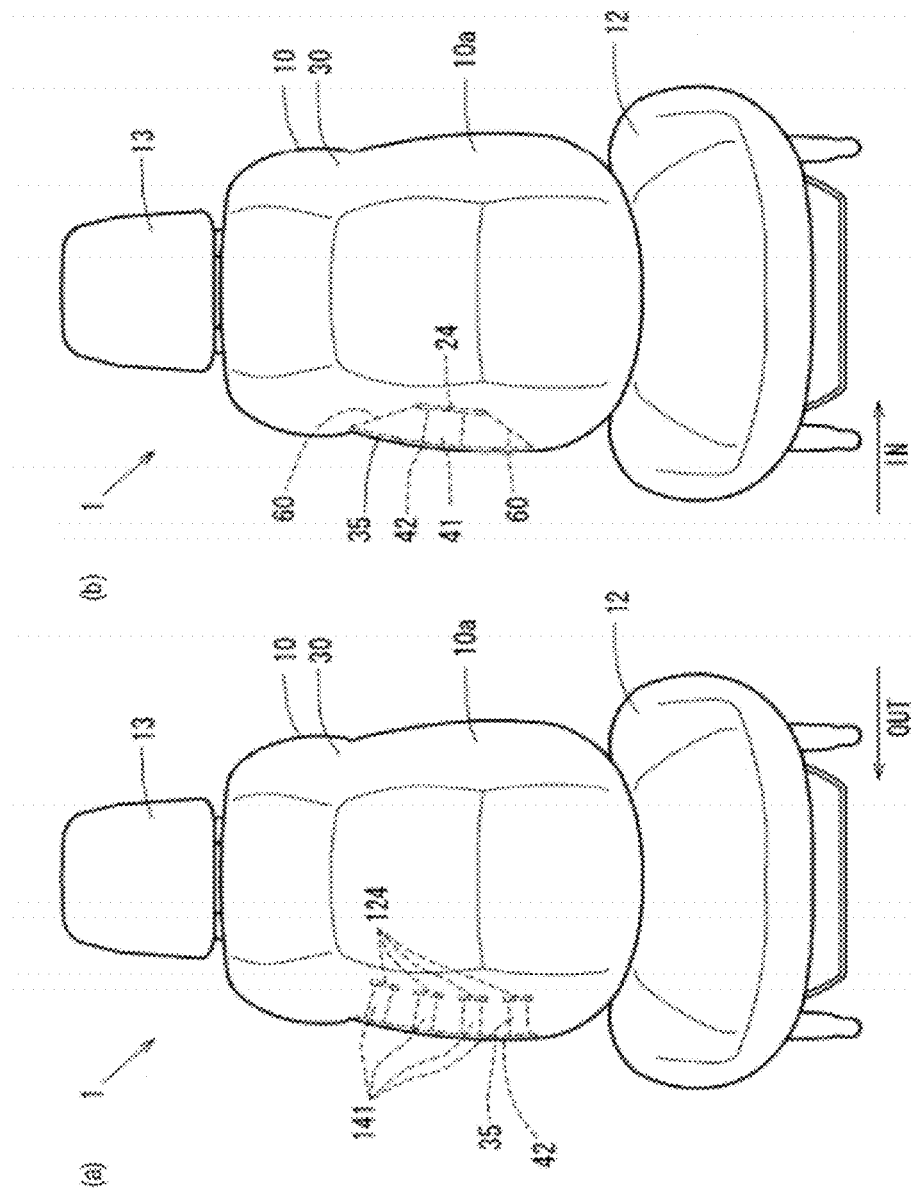
FIG. 9 is schematic views of an airbag according to still another embodiment of the invention.

FIG. 9 shows schematic views of some other embodiments, and as shown in (a) of FIG. 9, two or more penetration slits 124 are arranged at predetermined intervals. The penetration slits 124 may be arranged in the same plane as the first penetration slit 24 of the previous embodiments, and may be shorter than the first penetration slit 24 in the up-and-down direction. Low expansion members 141 having a narrower width w may pass through each penetration slit 124, and the penetration slits 124 may be fixed to the side front-face skin 32 in the vicinity of the fragile part 35.

Thus, for example, if the first penetration slit 24 of the previous embodiments is formed so as to exceed a half of the height of the seat back 10, the side support pad part 23 between the first penetration slit 24 and the second penetration slit 25 can be easily blown away by the deployment pressure of the airbag 52 to improve the deployment capability of the airbag 52. However, in this case, the first penetration slit 24 which is long in the up-and-down direction may reduce the cushioning properties of the cushion pad 20, and thereby the comfortableness of the seat may be degraded.

However, because the two or more short penetration slits 124 having the short length in the up-and-down direction are arranged at the predetermined intervals in this embodiment as described above, they can prevent the cushioning properties of the cushion pad 20 from degrading, and thereby its comfortableness will not be degraded. Therefore, the side support pad part 23 between the penetration slit 124 and the second penetration slit 25 can be easily blown away by the deployment pressure of the airbag 52 and, thus, the deployment capability of the airbag 52 can be improved.

In the above, the low expansion members 141 are arranged so as to penetrate all of the penetration slits 124. However, the low expansion members 141 may penetrate at least one penetration slit 124. In that case, other penetration slits 124 do not have to be penetrated, and they may be formed in notches having a depth of a half of the thickness of the cushion pad 20, for example.

Embodiment 6

Alternatively, as shown in (b) of FIG. 9, weakened lines 60 may be formed above and below the first penetration slit 24 so that they are formed outwardly (OUT) from the first penetration slit 24. Each weakened line 60 is a weakened part formed so that it spreads in the up-and-down direction to the outside (OUT) from the upper and lower ends of the first penetration slit 24. The weakened line 60 is configured by a notch that is formed to have a depth of about half of the thickness from the inside.

Figure 10:
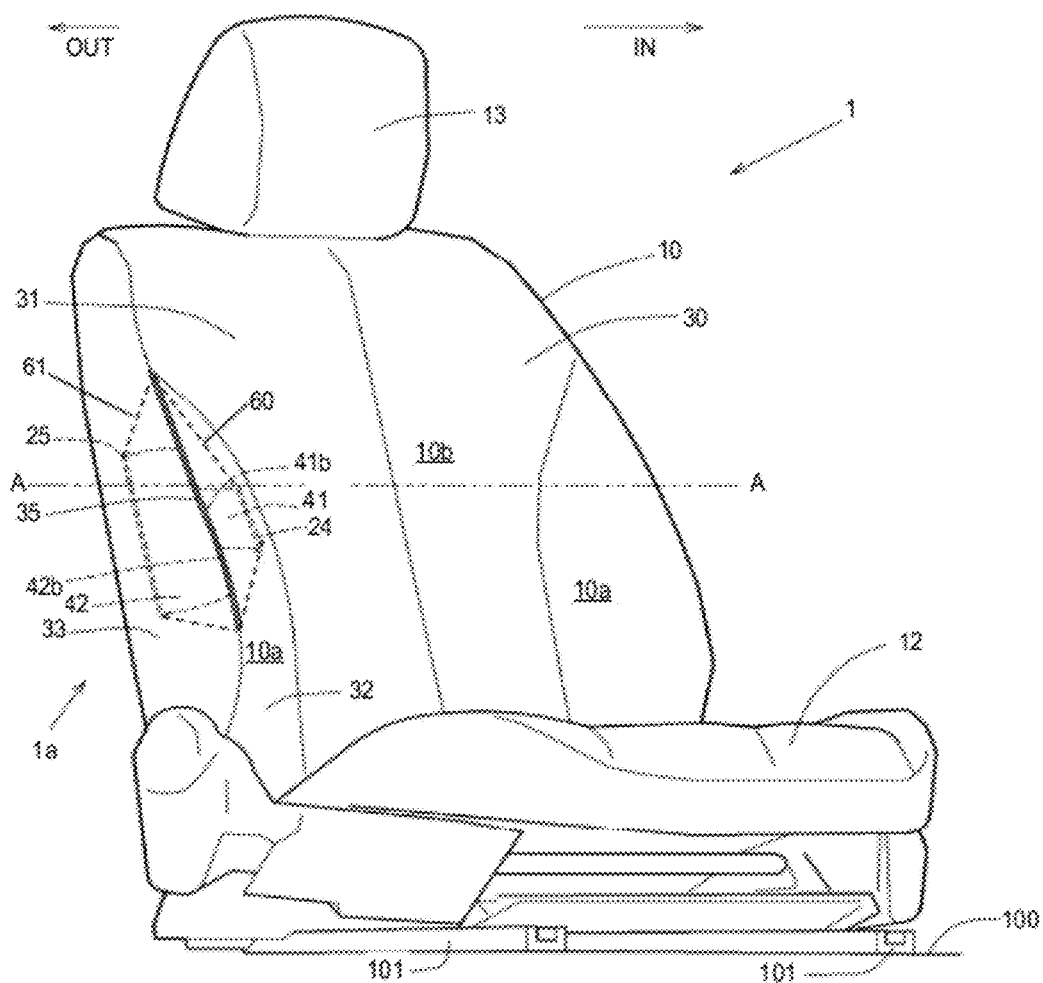
FIG. 10 is a schematic view of an airbag according to another embodiment of the invention.

The weakened lines 60 are formed so that they connect the fragile part 35 and the first penetration slit 24 at their upper ends and lower ends. Alternatively, as shown in FIG. 10, an additional weakened line 61 may be formed so that it connects the fragile part 35 and the second penetration slit 25 at their upper ends and lower ends.

Thereby, the side support pad part 23 outward (OUT) of the first penetration slit 24 can be broken open along the weakened lines 60 and 61 by the deployment pressure of the airbag 52 so that the airbag 52 can be blown away easily to forward (F) and backward (B).

Embodiment 7

Alternatively, as shown in FIG. 11, the first penetration slit 24 and the front low-expansion member 41 may be configured similar to the previous configuration shown in FIG. 5, and they may not have the second penetration slit and the side low-expansion member. In this case, the side support pad part 23 (especially, the front support pad part 23a) which faces inwardly in the vehicle width direction from the fragile part 35 and outwardly in the vehicle width direction from the first penetration slit 24 does not fly away while being fully broken open from its back face at the time of deployment of the airbag. Rather, the side support pad part 23 moves forward and outward in the vehicle width direction by the airbag deployment, while being held by the pad part 22 and the like.

Regarding the correspondence between the configuration of the claims and configuration of the embodiments described above, a seat for a vehicle in the claims corresponds to the seat 1 for the vehicle, and similar for the following:

outward in a vehicle width direction corresponds to outward of the vehicle (OUT);

a side airbag device corresponds to the side airbag unit 50;

a cushion pad corresponds to the side support pad part 23;

an skin material corresponds to the seat skin 30;

a side support of the skin material corresponds to the side front-face skin 32 and the side side-face skin 33;

a slit and a first slit correspond to the first penetration slits 24 and 24a, respectively;

a center side in the vehicle width direction corresponds to inward of the vehicle (IN);

a front skin material corresponds to the side front-face skin 32;

an end coupled to the front skin material in the vicinity of a fragile part and a first fragile part corresponds to the outer end part 41b;

the other end fixed to a seat back frame corresponds to the inner end part 41a;

a first low-expansion member corresponds to the front low-expansion member 41;

a base end of an airbag corresponds to the airbag base end 52a;

a side skin material corresponds to the side side-face skin 33;

an end coupled to the side skin material in the vicinity of the fragile part and the first fragile part corresponds to the outer end part 42b;

a second low-expansion member corresponds to the side low-expansion member 42;

outer face of the cushion pad in the vehicle width direction corresponds to the side-face support pad part 23b;

a second fragile part corresponds to the weakened line 60; and a pad cut part corresponds to the penetration slit 124.

However, the present invention is not limited to the configuration of the embodiments described above, and the invention may attain many different embodiments. For example, the present invention may be implemented using a so-called "passenger seat."

Further, in the embodiments described above, although the fragile part 35 is formed by stitching with the weak stitches having a weak stitching strength, the fragile part may also be formed by stitching with the same type of stitches but using weak threads.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A side airbag structure equipped with a seatback of a seat for a vehicle, comprising:
a side support provided outside of the seatback in a vehicle width direction, wherein the side support is capable of supporting a passenger of the vehicle;
a side airbag unit disposed in the side support and attached to a seatback frame of the seatback, wherein the side airbag unit includes an airbag that inflates frontward in a vehicle collision;
a cushion pad covering at least a front side of the side airbag unit;
a seat skin enveloping the side airbag unit and the cushion pad;
a first fragile part provided on the seat skin, wherein the first fragile part is cleaved by an inflation of the airbag and allows the airbag to deploy through the cleaved first fragile part and out of the seat skin; and
a first slit provided on the cushion pad in the side support and inside of the first fragile part in the vehicle width direction, wherein the first slit passes through the cushion pad in a vehicle longitudinal direction, wherein
the seat skin includes a front skin covering a front side of the cushion pad at least between an inner end of the side support in the vehicle width direction and the first fragile part,
a first low expansion member is disposed inside of the front skin, wherein one end of the first low expansion member is attached to the inside of the front skin in the vicinity of the first fragile part and the other end of the first low expansion member is attached to the seatback frame through the first slit, so that the first low expansion member inhibits the front skin from expanding due to the inflation of the airbag, and
the cushion pad located outside of the first slit in the vehicle width direction and inside of the first fragile part in the vehicle width direction is moved outward and frontward by the inflation of the airbag in a vehicle collision and wherein the cushion pad is not disposed outside of the side airbag unit in the vehicle width direction.

2. The side airbag structure according to claim 1 wherein, the airbag is contained in the side airbag unit with at least a base portion of the airbag accordion-folded.

3. The side airbag structure according to claim 1 further comprising:
a second fragile part provided on the cushion pad in the vicinity of at least one of an upper end and a lower end of the first slit, wherein the second fragile part extends substantially in the vehicle width direction.

4. The side airbag structure according to claim 1 further comprising:
a plurality of notches provided on the cushion pad in the side support and inside of the first fragile part in the vehicle width direction, wherein the plurality of notches are lined up in a vertical direction; wherein
the first slit is composed of at least one of the notches.

5. The side airbag structure according to claim 1 wherein, the seat skin includes a side skin that covers the cushion pad at least between a side end of the side support in the vehicle width direction and the first fragile part, and further comprising:
a second low expansion member disposed inside of the side skin, wherein one end of the second low expansion member is attached to the inside of the side skin in the vicinity of the first fragile part and the other end of the second low expansion member is attached to the seatback frame.

6. The side airbag structure according to claim 1 wherein, the airbag is contained in the side airbag unit with the airbag folded to be rolled outward in the vehicle width direction.

7. The side airbag structure according to claim 1 wherein, the cushion pad located outside of the first slit in the vehicle width direction and inside of the first fragile part in the vehicle width direction is moved outward of the inflated airbag in a vehicle collision.

8. A side airbag structure equipped with a seatback of a seat for a vehicle, comprising:
a side support provided outside of the seatback in a vehicle width direction, wherein the side support is capable of supporting a passenger of the vehicle;
a side airbag unit disposed in the side support and attached to a seatback frame of the seatback, wherein the side airbag unit includes an airbag that inflates frontward in a vehicle collision;
a cushion pad covering at least a front side of the side airbag unit;
a seat skin enveloping the side airbag unit and the cushion pad;
a first fragile part provided on the seat skin, wherein the first fragile part is cleaved by an inflation of the airbag and allows the airbag to deploy through the cleaved first fragile part and out of the seat skin;
a first slit provided on the cushion pad in the side support and inside of the first fragile part in the vehicle width direction, wherein the first slit passes through the cushion pad in a vehicle longitudinal direction, wherein
the seat skin includes a front skin covering a front side of the cushion pad at least between an inner end of the side support in the vehicle width direction and the first fragile part,
a first low expansion member is disposed inside of the front skin, wherein one end of the first low expansion member is attached to the inside of the front skin in the vicinity of the first fragile part and the other end of the first low expansion member is attached to the seatback frame through the first slit, so that the first low expansion member inhibits the front skin from expanding due to the inflation of the airbag, and
the cushion pad located outside of the first slit in the vehicle width direction and inside of the first fragile part in the vehicle width direction is moved outward and frontward by the inflation of the airbag in a vehicle collision, wherein
the seat skin includes a side skin that covers the cushion pad at least between a side end of the side support in the vehicle width direction and the first fragile part, and further comprising:
a second low expansion member disposed inside of the side skin, wherein one end of the second low expansion member is attached to the inside of the side skin in the vicinity of the first fragile part and the other end of the second low expansion member is attached to the seatback frame; and
a second slit provided on the cushion pad and behind the first fragile part in the vehicle longitudinal direction, wherein the second slit allows the second low expansion member to pass through the cushion pad in the vehicle width direction.

9. A side airbag structure equipped with a seatback of a seat for a vehicle, comprising:
a side support provided outside of the seatback in a vehicle width direction, wherein the side support is capable of supporting a passenger of the vehicle;

a side airbag unit disposed in the side support and attached to a seatback frame of the seatback, wherein the side airbag unit includes an airbag that inflates frontward in a vehicle collision;

a cushion pad covering at least a front side of the side airbag unit;

a seat skin enveloping the side airbag unit and the cushion pad;

a first fragile part provided on the seat skin, wherein the first fragile part is cleaved by an inflation of the airbag and allows the airbag to deploy through the cleaved first fragile part and out of the seat skin; and a first slit provided on the cushion pad in the side support and inside of the first fragile part in the vehicle width direction, wherein the first slit passes through the cushion pad in a vehicle longitudinal direction, wherein the seat skin includes a front skin covering a front side of the cushion pad at least between an inner end of the side support in the vehicle width direction and the first fragile part, a first low expansion member is disposed inside of the front skin, wherein one end of the first low expansion member is attached to the inside of the front skin in the vicinity of the first fragile part and the other end of the first low expansion member is attached to the seatback frame through the first slit, so that the first low expansion member inhibits the front skin from expanding due to the inflation of the airbag, and the cushion pad located outside of the first slit in the vehicle width direction and inside of the first fragile part in the vehicle width direction is moved outward and frontward by the inflation of the airbag in a vehicle collision wherein, the airbag is deployed through the first slit in a vehicle collision.

\* \* \* \* \*